(12) United States Patent
Nawa et al.

(10) Patent No.: US 7,012,036 B2
(45) Date of Patent: Mar. 14, 2006

(54) $ZrO_2$-$AL_2O_3$ COMPOSITE CERAMIC MATERIAL AND PRODUCTION METHOD THEREOF

(75) Inventors: Masahiro Nawa, Katano (JP); Kouichi Yamaguchi, Otsu (JP); Motoyuki Toki, Kyoto (JP)

(73) Assignee: Matsushita Electric Works, Ltd., Kadoma (JP)

( * ) Notice: Subject to any disclaimer, the term of this patent is extended or adjusted under 35 U.S.C. 154(b) by 132 days.

(21) Appl. No.: 10/621,385

(22) Filed: Jul. 18, 2003

(65) Prior Publication Data

US 2004/0067839 A1   Apr. 8, 2004

(30) Foreign Application Priority Data

Jul. 19, 2002   (JP) ............................. 2002-211619

(51) Int. Cl.
*C04B 35/488*   (2006.01)

(52) U.S. Cl. ...................... 501/105; 501/127; 501/152; 501/153

(58) Field of Classification Search ................ 501/105, 501/127, 152, 153
See application file for complete search history.

(56) References Cited

U.S. PATENT DOCUMENTS

| | | | |
|---|---|---|---|
| 4,820,666 A | * | 4/1989 | Hirano et al. ................ 501/104 |
| 5,338,713 A | * | 8/1994 | Takagi et al. ................ 501/105 |
| 5,728,636 A | | 3/1998 | Nawa et al. |

FOREIGN PATENT DOCUMENTS

| | | |
|---|---|---|
| EP | 0 834 484 A1 | 4/1998 |
| JP | 5-246760 | 9/1993 |
| WO | WO 200211780 A1 * | 2/2002 |

OTHER PUBLICATIONS

M. Nawa, et al., Journal of the European Ceramic Society, vol. 18, pp. 209-219, "The Effect of $TiO_2$ Addition on Strengthening and Toughening in Intragranular Type of 12Ce-TZP/$Al_2O_3$ Nanocomposites", 1998.

M. Nawa, et al., "Developmental of Tough and Strong Ceria Stabilized Tetragonal Zirconia Nanocomposite and Its Application", Matsushita Electrical Works Technical Report, No. 71, pp. 77-83 (Aug. 2000).

D.H. Shim, et al., "Microstructure and mechanical properties of Al2O3/t-ZrO2 particulate composites", Chemical Abstracts Service, XP002345199, AN 132:67911 (2000).

V.V. Mishra, et al., "Effect of cerium zirconate ($Ce_2Zr_2O_7$) on microstructure and mechanical properties of Ce-ZTA", Journal of Materials Science, vol. 37, pp. 197-202 (2002).

* cited by examiner

*Primary Examiner*—David Sample
(74) *Attorney, Agent, or Firm*—Oblon, Spivak, McClelland, Maier & Neustadt, P.C.

(57) ABSTRACT

A $ZrO_2$—$Al_2O_3$ composite ceramic material having high mechanical strength and toughness as well as excellent wear resistance and hardness is provided. This ceramic material includes a first phase of $ZrO_2$ grains containing 10 to 12 mol % of $CeO_2$ as a stabilizer and having an average grain size of 0.1 $\mu$m to 1 $\mu$m, and a second phase of $Al_2O_3$ grains having an average grain size of 0.1 to 0.5 $\mu$m. The ceramic material has a mutual nano-composite structure formed under a condition that a content of the second phase in the ceramic material is within a range of 20 to 60 vol % such that the $Al_2O_3$ grains are dispersed within said $ZrO_2$ grains at a first dispersion ratio of 2% or more, and preferably 4% or more, which is defined as a ratio of the number of the $Al_2O_3$ grains dispersed within the $ZrO_2$ grains relative to the number of the entire $Al_2O_3$ grains dispersed in the ceramic material, and the $ZrO_2$ grains are dispersed within the $Al_2O_3$ grains at a second dispersion ratio of 1% or more, which is defined as a ratio of the number of the $ZrO_2$ grains dispersed within the $Al_2O_3$ grains relative to the number of the entire $ZrO_2$ grains dispersed in the ceramic material.

2 Claims, No Drawings

ZRO₂-AL₂O₃ COMPOSITE CERAMIC MATERIAL AND PRODUCTION METHOD THEREOF

BACKGROUND OF THE INVENTION

1. Field of the Invention

The present invention relates to a $ZrO_2$—$Al_2O_3$ composite ceramic material having high mechanical strength and toughness as well as excellent wear resistance and hardness under a relatively larger $Al_2O_3$ content than before, and a production method therefor.

2. Disclosure of the Prior Art

As compared with metal materials and plastic materials, ceramic materials have excellent performance such as hardness, wear resistance, heat resistance and corrosion resistance. However, for the actual use of the ceramic materials in wide application fields such as mechanical parts for automobiles, airplanes, space crafts and so on, cutting tools including drills and surgical knives, medical device, and biomaterial parts such as artificial joints and artificial tooth, it is desired to develop a ceramic material having good balance between mechanical strength and toughness in a high level. As one of potential candidates of such a ceramic material, attention is being given to a $ZrO_2$—$Al_2O_3$ composite ceramic material.

For example, Japanese Patent Early publication [kokai] No. 5-246760 discloses a $ZrO_2$-based ceramic composite material having improved mechanical strength and toughness. This ceramic material is composed of a matrix phase of tetragonal $ZrO_2$ grains containing 5 to 30 mol % of $CeO_2$ and a dispersion phase of fine grains of at least one selected from the group of $Al_2O_3$, SiC, $Si_3N_4$ and $B_4C$, which are dispersed within the $ZrO_2$ grains and grain boundaries of the $ZrO_2$ grains. By the presence of the dispersion phase, a grain growth of the matrix phase can be prevented, so that there are advantages that a fine structure of the matrix phase is obtained, the stabilization of tetragonal $ZrO_2$ is enhanced, and a reduction in flaw size is achieved.

In addition, U.S. Pat. No. 5,728,636 discloses a $ZrO_2$-based ceramic material having high mechanical strength and toughness. This ceramic material comprises a first phase of partially stabilized $ZrO_2$ grains having an average grain size of 5 μm or less, and containing 8 to 12 mol % of $CeO_2$ and 0.05 to 4 mol % of $TiO_2$, and a second phase of $Al_2O_3$ grains having an average grain size of 2 μm or less. A content of the second phase in the ceramic material is within a range of 0.5 to 50 vol %. The $Al_2O_3$ grains are dispersed within the $ZrO_2$ grains at a dispersion ratio of 2% or more, which is defined as a ratio of the number of the $Al_2O_3$ grains dispersed within the $ZrO_2$ grains relative to the number of the entire $Al_2O_3$ grains dispersed in the composite ceramic material.

In addition, this ceramic material is produced by mixing a first ingredient for providing the partially stabilized $ZrO_2$ grains containing the above described ranges of $CeO_2$ and $TiO_2$, with a second ingredient for providing the $Al_2O_3$ grains, molding a resultant mixture into a desired shape to obtain a green compact, and then performing pressureless sintering of the green compact in the oxygen-containing atmosphere. In this US patent, by use of the required amounts of $CeO_2$ and $TiO_2$ as the stabilizer for $ZrO_2$, the grain growth of the $ZrO_2$ grains is enhanced to a moderate degree, so that parts of the $Al_2O_3$ grains are allowed to effectively disperse within the $ZrO_2$ grains, and a critical stress is increased, derived from a stress-induced phase transformation from the tetragonal $ZrO_2$ to the monoclinic $ZrO_2$.

However, since the grain growth of $ZrO_2$ is inhibited as the content of $Al_2O_3$ in the ceramic material increases, there is a tendency of reducing the number of the $Al_2O_3$ grains dispersed within the $ZrO_2$ grains, i.e., the dispersion ratio described above. The reduction in dispersion ratio may deteriorate the balance between the mechanical strength and toughness. On the other hand, as the $Al_2O_3$ content increases, further improvements in hardness and wear resistance of the ceramic material are expected. Therefore, if a $ZrO_2$—$Al_2O_3$ composite ceramic material containing a relatively large amount of $Al_2O_3$ as compared with the conventional ones can be provided, which has excellent wear resistance and hardness brought by the increased $Al_2O_3$ content, while maintaining the good balance between the mechanical strength and toughness, commercialization of the ceramic material in the many application fields described above will be further promoted.

SUMMARY OF THE INVENTION

Therefore, a concern of the present invention is to provide a $ZrO_2$—$Al_2O_3$ composite ceramic material having excellent wear resistance and hardness as well as mechanical strength and toughness that are equal to or better than before under a larger $Al_2O_3$ content than before.

That is, the composite ceramic material comprises:

a first phase of $ZrO_2$ grains containing 10 to 12 mol % of $CeO_2$ as a stabilizer and having an average grain size of 0.1 μm to 1 μm, the $ZrO_2$ grains composed of 90 vol % or more of tetragonal $ZrO_2$;

a second phase of $Al_2O_3$ grains having an average grain size of 0.1 to 0.5 μm, a content of the second phase in the composite ceramic material being within a range of 20 to 60 vol %;

wherein the $Al_2O_3$ grains are dispersed within said $ZrO_2$ grains at a first dispersion ratio of 2% or more, and preferably 4% or more, which is defined as a ratio of the number of the $Al_2O_3$ grains dispersed within the $ZrO_2$ grains relative to the number of the entire $Al_2O_3$ grains dispersed in the composite ceramic material, and the $ZrO_2$ grains are dispersed within the $Al_2O_3$ grains at a second dispersion ratio of 1% or more, which is defined as a ratio of the number of the $ZrO_2$ grains dispersed within the $Al_2O_3$ grains relative to the number of the entire $ZrO_2$ grains dispersed in the composite ceramic material.

According to the present invention, even though the composite ceramic material contain a relatively large amount (e.g., 40 to 60 vol %) of the second phase ($Al_2O_3$), the first dispersion ratio as to the number of the $Al_2O_3$ grains dispersed within the $ZrO_2$ is equal to or higher than before, and also the $ZrO_2$ grains are surely dispersed within the $Al_2O_3$ grains by the second dispersion ratio of 1% or more. In the present specification, a structure having extremely fine $ZrO_2$ grains of the first phase dispersed in the $Al_2O_3$ grains of the second phase, and extremely fine $Al_2O_3$ grains of the second phase dispersed in the $ZrO_2$ grains of the first phase is called as "mutual nano-composite structure". Therefore, the formation of this mutual nano-composite structure presents advantages that a finer-grained structure of the ceramic composite material is obtained, and such as sub-grain boundaries formed within the crystal grains due to the piled up dislocations have a role in dividing the crystal grain size into imaginary more finer sized particles, and the residual stress generated within the crystal grains bring the increase of the critical stress required for causing the stress-induced phase transformation from the tetragonal $ZrO_2$ to the monoclinic $ZrO_2$ by the extremely fine grains of the first (or second) phase dispersed within the crystal grains of the second (or first) phase. As a result, it is possible to provide a ceramic composite material having mechanical strength, toughness, hardness and wear resistance in high levels not heretofore attained.

As a particularly preferred embodiment of the present invention, the composite ceramic material is composed of a first phase of $ZrO_2$ grains including 90 vol % or more of tetragonal $ZrO_2$, which are obtained by use of 10 to 12 mol % of $CeO_2$ and 0.02 to 1 mol % of $TiO_2$ as a stabilizer, and having an average grain size of 0.1 μm to 1 μm, and a second phase of $Al_2O_3$ grains having an average grain size of 0.1 to 0.5 μm. The composite ceramic material is characterized by a mutual nano-composite structure formed under a condition that a content of the second phase in the composite ceramic material is within a range of 20 to 60 vol % such that the $Al_2O_3$ grains are dispersed within the $ZrO_2$ grains at the first dispersion ratio of 4% or more, and the $ZrO_2$ grains are dispersed within the $Al_2O_3$ grains at the second dispersion ratio of 1% or more.

A further concern of the present invention is to provide a method of producing the $ZrO_2$—$Al_2O_3$ composite ceramic material described above. That is, this method comprises the steps of:

preparing a first power for providing the first phase and a second powder for providing the second phase;

mixing the first powder with the second powder such that a content of the second phase in the composite ceramic material is within a range of 20 to 60 vol %;

molding a resultant mixture in a desired shape to obtain a green compact; and sintering the green compact at a sintering temperature in an oxygen-containing atmosphere.

In the above method, it is preferred that the second powder includes a γ-$Al_2O_3$ powder having a specific surface within the range of 10 to 100 $m^2/g$ and a substantially spherical shape. In particular, it is preferred that the second powder is a mixture of an α-$Al_2O_3$ powder having an average particle size of 0.3 μm or less, and a γ-$Al_2O_3$ powder having a specific surface within the range of 10 to 100 $m^2/g$ and a substantially spherical shape. In addition, it is preferred that the resultant mixture is calcined at a temperature of 800° C. or more and less than the sintering temperature, then pulverized to obtain a calcined powder, and the green compact of the calcined powder is sintered in the oxygen-containing atmosphere.

These and still other objects and advantages of the present invention will become more apparent from the detail description of the invention and preferred examples explained below.

DETAIL DESCRIPTION OF THE INVENTION

A $ZrO_2$—$Al_2O_3$ composite ceramic material of the present invention and a production method thereof are explained in detail below.

This composite ceramic material is composed of a first phase of $ZrO_2$ grains and a second phase of $Al_2O_3$ grains. That is, $ZrO_2$ grains of the first phase contains $CeO_2$ as a stabilizer for tetragonal $ZrO_2$. A content of $CeO_2$ in the first phase is within a range of 10 to 12 mol % with respect to a total amount of the first phase, so that the first phase is composed of 90 vol % or more of tetragonal $ZrO_2$. For example, it is preferred that the first phase is composed of 90 vol % or more of tetragonal $ZrO_2$ and the balance of monoclinic $ZrO_2$. As the $CeO_2$ content is less than 10 mol %, an amount of monoclinic $ZrO_2$ relatively increases, so that microcracks may occur in the composite ceramic material. On the other hand, when the $CeO_2$ content is more than 12 mol %, cubic $ZrO_2$ of a high-temperature stable phase begins to appear. In this case, since the amount of tetragonal $ZrO_2$ relatively decreases, improvements in mechanical strength and toughness brought by a stress-induced phase transformation from the tetragonal $ZrO_2$ to the monoclinic $ZrO_2$ can not be sufficiently achieved.

In addition, the $ZrO_2$ grains of the first phase have an average grain size of 0.1 μm to 1 μm. When the average grain size is more than 1 μm, it may lead to reductions in mechanical strength and wear resistance of the composite ceramic material. On the other hand, when the average grain size is less than 0.1 μm, it becomes difficult to obtain the composite ceramic material having a sufficient density by pressureless sintering.

The first phase may contain another stabilizer such as MgO, CaO, $TiO_2$ and/or $Y_2O_3$ in addition to $CeO_2$. To further improve the mechanical properties of the composite ceramic material, it is particularly preferred to use 0.02 to 1 mol % of $TiO_2$ and 10 to 12 mol % of $CeO_2$ as the stabilizer with respect to the total amount of the first phase. In this case, grain growth of the first phase is enhanced to a moderate degree, so that fine $Al_2O_3$ grains of the second phase can be easily dispersed in the $ZrO_2$ grains of the first phase. In addition, it is possible to increase a critical stress derived from the stress-induced phase transformation. When the additive amount of $TiO_2$ is less than 0.02 mol %, the effect of enhancing the grain growth of the first phase may be not enough. On the other hand, when the additive amount of $TiO_2$ content is more than 1 mol %, abnormal grain growth of the first phase easily occurs, so that the mechanical strength and/or wear resistance of the composite ceramic material may deteriorate. The first phase may contain a small amount of impurities. In such a case, it is desired that the amount of the impurities is 0.5 mol % or less with respect to the total amount of the first phase.

In the present invention, $Al_2O_3$ grains of the second phase have an average grain size of 0.1 μm to 0.5 μm. When the average grain size is more than 0.5 μm, the $Al_2O_3$ grains can not be dispersed within the $ZrO_2$ grains of the first phase at a first dispersion ratio defined later of 4% or more. On the other hand, when the average grain size is less than 0.1 μm, it becomes difficult to obtain the composite ceramic material having a sufficient density by pressureless sintering.

The composite ceramic material of the present invention contains 20 to 60 vol % of the second phase. When the content of the second phase is less than 20 vol %, the mechanical strength and the wear resistance of the composite ceramic material can not be sufficiently improved. On the other hand, as the content of the second phase is more than 60 vol %, considerable reductions in mechanical strength and toughness may occur. In particular, when the composite ceramic material contains 30 to 40 vol % of the second phase, it is possible to provide the ceramic composite material having well-balanced mechanical strength and toughness in higher levels.

By the way, the present invention is characterized in that the composite ceramic material has a mutual nano-composite structure formed under the condition that the content of the second phase is within the range of 20 to 60 vol %, and preferably 30 to 40 vol % such that fine $Al_2O_3$ grains having sizes of several ten nanometers are dispersed within the $ZrO_2$ grains at a first dispersion ratio of 2% or more, and preferably 4% or more, which is defined as a ratio of the number of the $Al_2O_3$ grains dispersed within the $ZrO_2$ grains relative to the number of the entire $Al_2O_3$ grains dispersed in the composite ceramic material, and fine $ZrO_2$ grains having sizes of several ten nanometers are dispersed within the $Al_2O_3$ grains at a second dispersion ratio of 1% or more, which is defined as a ratio of the number of the $ZrO_2$ grains dispersed within the $Al_2O_3$ grains relative to the number of the entire $ZrO_2$ grains dispersed in the composite ceramic material.

By the formation of this mutual nano-composite structure, a finer-grained structure of the ceramic composite material can be obtained. That is, since, for example, sub-grain boundaries are formed within the crystal grains due to the piled up dislocations by the fine $ZrO_2$ grains (or $Al_2O_3$ grains) dispersed within the $Al_2O_3$ grains (or $ZrO_2$ grains), mechanical strength and wear resistance of the ceramic composite material can be remarkably improved. In particular, when the content of the second phase is within the range of 30 to 40 vol %, it is possible to remarkably reinforce the second phase of the composite ceramic material by the formation of a ZTA (zirocnia toughened alumina) structure, which is composed of the fine tetragonal $ZrO_2$ grains of the first phase uniformly dispersed within the $Al_2O_3$ grains of the second phase, in the ceramic composite material.

In the case of a conventional composite ceramic material having a structure that $ZrO_2$ grains having an average grain size of several microns are uniformly mixed with $Al_2O_3$ grains having an average grain size of several microns, when the $Al_2O_3$ content is more than 30 vol %, the stress-induced phase transformation from the tetragonal $ZrO_2$ to the monoclinic $ZrO_2$ is no longer a significant mechanism of improving the toughness of the composite ceramic material, so that the mechanical strength and toughness gradually decrease. When the $Al_2O_3$ content is more than 50 vol %, which means that the matrix phase of the composite ceramic material is composed of $Al_2O_3$, considerable deterioration in mechanical properties of the composite ceramic material may occur.

On the contrary, in the case of the ceramic composite material of the present invention having the mutual nano-composite structure described above, even when the $Al_2O_3$ content is more than 50 vol %, it is possible to maintain the mechanical strength and toughness in high levels by the formation of the finer-grained structure and the effective reinforcement of crystal grains by the extremely fine $ZrO_2$ grains (or $Al_2O_3$ grains) dispersed within the $Al_2O_3$ grains (or $ZrO_2$ grains).

That is, it is believed that the mechanical properties of the ceramic composite material of the present invention are improved by the following mechanism. When parts of fine $Al_2O_3$ grains of the second phase are dispersed within tetragonal $ZrO_2$ grains of the first phase, and parts of fine tetragonal $ZrO_2$ grains of the first phase are dispersed within $Al_2O_3$ grains of the second phase, a residual stress field are locally generated around each of fine grains dispersed within the crystal grains, during cooling procedure after sintering, due to a difference in thermal expansion coefficient between $Al_2O_3$ and $ZrO_2$. By the influence of this residual stress field, dislocations easily occur within the respective crystal grains. The dislocations are piled up each other and finally are formed sub-grain boundaries within the crystal grains, i.e., $ZrO_2$ grains and $Al_2O_3$ grains. The sub-grain boundaries provide the finer-grained structure, which has the capability of increasing a critical stress required for causing the stress-induced phase transformation from the tetragonal $ZrO_2$ to the monoclinic $ZrO_2$. As a result, the composite ceramic material of the present invention demonstrates high mechanical strength and toughness as well as excellent wear resistance and hardness.

When the first and second dispersion ratios are respectively less than 2% and less than 1%, it becomes difficult to prevent a reduction in mechanical strength under a large $Al_2O_3$ content of 30 to 40 vol % because the condition of the finer-grained structure is insufficient, related to the formation of the sub-grain boundaries and so on. In particular, when the first dispersion ratio is 4% or more, it is possible to achieve well-balanced mechanical strength and toughness in higher levels. Upper limits of the first and second dispersion ratios are not specifically limited. Conceptually, as the first and second dispersion ratios increase, further improvements of mechanical properties of the composite ceramic material are expected.

The composite ceramic material of the present invention is preferably used in an application requiring excellent wear resistance expected by increasing the $Al_2O_3$ content, while maintaining mechanical strength and toughness of the conventional $ZrO_2$—$Al_2O_3$ composite ceramic materials. For example, it is preferred to use the composite ceramic material of the present invention for an artificial joint described in the international patent application WO02/11780. That is, when a joint portion of the artificial joint is provided by a sliding contact between the composite ceramic material and polyethylene, it is possible to reduce a wear amount of polyethylene. In addition, when the joint portion of the artificial joint is formed by a sliding contact between the composite ceramic materials, excellent wear resistance can be achieved. Thus, by use of the composite ceramic material of the present invention, it is possible to obtain the artificial joint having the capability of stably providing a smooth joint motion for an extended time period under severe conditions.

Next, the method of producing the $ZrO_2$—$Al_2O_3$ composite ceramic material of the present invention is explained in detail. That is, this production method comprises the steps of preparing a first power for providing the $ZrO_2$ grains of the first phase and a second powder for providing the $Al_2O_3$ grains of the second phase, mixing the first powder with the second powder such that a content of the second phase in the composite ceramic material is within the range of 20 to 60 vol %, molding a resultant mixture in a desired shape to obtain a green compact, and sintering the green compact at a sintering temperature in an oxygen-containing atmosphere.

The first powder is prepared such that the $CeO_2$ content in the first phase of the produced composite ceramic material is within the range of 10 to 12 mol %, and the first phase is composed of 90 vol % or more of tetragonal $ZrO_2$. In addition, as the first powder, it is preferred to use a tetragonal $ZrO_2$ powder obtained by allowing $ZrO_2$ to form a sold solution with required amounts of $CeO_2$ and $TiO_2$. The method of preparing the first powder is not limited. However, for example, the following method is recommended.

That is, a cerium containing compound such as cerium salts is added to an aqueous solution of a zirconium salt. If necessary, an aqueous solution of a titanium salt or a titanium containing compound such as an organic solution of titanium alcoxide may be added. Then, hydrolysis is performed by adding an alkali aqueous solution such as aqueous ammonia to a resultant mixture solution to obtain a precipitate. The precipitate is dried, calcined in the oxygen-containing atmosphere, and pulverized by means of wet ball milling to obtain the tetragonal $ZrO_2$ powder having a desired particle distribution.

In the case of using the tetragonal $ZrO_2$ powder described above, it is preferred that the $ZrO_2$ powder has a specific surface of 10 to 20 $m^2/g$. In this case, the green compact having a sufficient density can be obtained. Such a green compact can be easily sintered by pressureless sintering.

When the specific surface is less than 10 m²/g, it becomes difficult to obtain the first phase having the average grain size of 1 μm or less after the sintering step. On the other hand, when the specific surface is more than 20 m²/g, the powder density considerably decreases, so that the first powder becomes hard to handle. As a result, it is difficult to obtain the sintered body having a sufficient density by pressureless sintering.

The second powder is prepared such that $Al_2O_3$ is generated by the sintering step. For example, an $Al_2O_3$ powder can be used. In particular, it is preferred that the second powder includes a γ-$Al_2O_3$ powder having a specific surface within a range of 10 to 100 m²/g and a substantially spherical shape. As compared with a case of using a bulky γ-$Al_2O_3$ powder having a specific surface of more than 100 m²/g and a substantially needle shape, there are advantages that formability is improved, and the average grain size of the second phase of the produced composite ceramic material can be easily controlled within the range of 0.1 μm to 0.5 μm. In addition, it is possible to obtain the mutual nano-composite structure having increased first and second dispersion ratios. On the other hand, when the specific surface is less than 10 m²/g, it becomes difficult to obtain the second phase having the average grain size of 0.5 μm or less after the sintering step.

A method of preparing the second powder is not specifically limited. However, for example, a dry process such as a laser abrasion method or a plasma deposition method may be used. Alternatively, hydrolysis is performed by adding an alkali aqueous solution such as aqueous ammonia to an aqueous solution of an aluminum salt to obtain a precipitate. The precipitate is dried, calcined in the atmosphere, and pulverized by means of wet ball milling and so on to obtain the second powder having a desired particle distribution.

As the second powder, it is also preferred to use a mixture of an α-$Al_2O_3$ powder having an average particle size of 0.3 μm or less, and a γ-$Al_2O_3$ powder having a specific surface within the range of 10 to 100 m²/g and a substantially spherical shape. As compared with the case of using only the γ-$Al_2O_3$ powder as the second powder, there is an advantage that the mutual nano-composite structure of the composite ceramic material is easily formed at increased first and second dispersion ratios.

A mixture ratio of the α-$Al_2O_3$ powder and the γ-$Al_2O_3$ powder is not specifically limited. However, it is preferred that an additive amount of the α-$Al_2O_3$ powder is 50% or less with respect to the total volume of the second powder to obtain the mutual nano-composite structure having increased first and second dispersion ratios. As the additive amount of the α-$Al_2O_3$ powder becomes more than 50 vol %, there is a tendency that the first dispersion ratio gradually decreases. In addition, when performing the calcining step prior to the sintering step, the additive amount of the α-$Al_2O_3$ powder may be zero. However, when not performing the calcining step, it is preferred that the additive amount of the α-$Al_2O_3$ powder is 30 vol % or more to improve the mechanical strength of the composite ceramic material. As the α-$Al_2O_3$ powder, a commercially available α-$Al_2O_3$ powder may be used. A lower limit of the average grain size of the α-$Al_2O_3$ powder is not specifically limited. However, from the viewpoint of formability and handling, it is preferred to use the α-$Al_2O_3$ powder having the average grain size of 0.1 μm or more.

In the above production method, it is preferred that the resultant mixture of the first and second powders is calcined at a temperature of 800° C. or more and less than the sintering temperature in the oxygen-containing atmosphere, then pulverized by means of, for example, wet ball milling, and the green compact of a resultant calcined powder is sintered in the oxygen-containing atmosphere. By adopting the calcining step, it is possible to obtain the green compact having a sufficient density, and stably supply the composite ceramic material having high mechanical strength and toughness.

After the sintering step, a HIP (hot isostatic pressing) treatment may be performed in the oxygen-containing atmosphere. To obtain effects of the HIP treatment at the maximum, it is preferred that the sintered body of the composite ceramic material obtained by the sintering step has a relative density of 95% or more. A concentration of oxygen in the oxygen-containing atmosphere in the sintering step is not specifically limited. A mixture gas of oxygen and an inert gas such as argon may be used. In this case, it is preferred that the concentration of oxygen is approximately 5 vol % or more with respect to a total volume of the mixture gas.

EXAMPLES

Preferred examples of the present invention are explained below. However, needless to say, the present invention is not limited to these examples.

Examples 1 to 5 and Comparative Examples 1 to 3

A $ZrO_2$—$Al_2O_3$ composite ceramic material of each of Examples 1 to 5 and Comparative Examples 1 to 3 was produced by the following method. That is, as a first ingredient for providing $ZrO_2$ grains corresponding to a first phase of the composite ceramic material, a tetragonal $ZrO_2$ powder having a specific surface of 15 m²/g and containing 11 mol % of $CeO_2$ as a stabilizer and 0.04 mol % of $TiO_2$ was used. On the other hand, as a second ingredient for providing $Al_2O_3$ grains corresponding to a second phase of the composite ceramic material, a mixture of an α-$Al_2O_3$ powder having an average particle size of 0.2 μm, and a γ-$Al_2O_3$ powder prepared by a dry process of the laser abrasion method to have a specific surface of 50 m²/g and a substantially spherical shape of an average diameter of 33 nm was used. The mixture ratio by volume of the γ-$Al_2O_3$ powder to the α-$Al_2O_3$ powder is 70:30.

Next, the first and second ingredients were mixed at a mixture ratio shown in Table 1. In Comparative Example 1, the second ingredient was not used. A resultant mixture was pulverized in ethanol for 24 hours by means of wet ball milling, and then dried to obtain a first mixed powder. After the first mixed powder was calcined at 1000° C. for 3 hours in the air, a resultant calcined powder was pulverized in ethanol for 24 hours by means of wet ball milling, and then dried to obtain a second mixed powder. The second mixed powder was molded at the pressure of 10 MPa by uniaxial pressing to obtain a disk-shaped green compact having a diameter of 68 mm. In addition, a CIP (cold isostatic pressing) treatment was performed to the green compact at the pressure of 147 MPa. Subsequently, the green compact was sintered at the sintering temperature of 1440° C. for 3 hours in the air by pressureless sintering to obtain a sintering body.

With respect to each of Examples 1 to 5 and Comparative Examples 1 to 3, the sintered body has a relative density of more than 99%. From results of X-ray diffraction analysis, it was confirmed that the first phase of the respective sintered body is composed of 90 vol % or more of tetragonal $ZrO_2$ and the balance of monoclinic $ZrO_2$. From SEM (scanning electron microscope) and TEM (transmission electron microscope) observations of the sintered body, it was confirmed that the sintered body of each of Examples 1 to 5 and Comparative Examples 2 and 3 has a mutual nano-composite structure formed such that fine $Al_2O_3$ grains of the second phase are dispersed within the $ZrO_2$ grains of the first phase at a first dispersion ratio listed in Table 2, which is defined as a ratio of the number of the $Al_2O_3$ grains dispersed within the $ZrO_2$ grains relative to the number of the entire $Al_2O_3$ grains dispersed in the composite ceramic material, and fine $ZrO_2$ grains of the first phase are dispersed within the $Al_2O_3$ grains of the second phase at a second dispersion ratio listed in Table 2, which is defined as a ratio of the number of the $ZrO_2$ grains dispersed within the $Al_2O_3$ grains relative to the number of the entire $ZrO_2$ grains dispersed in the composite ceramic material.

The first and second dispersion ratios (W1, W2) were determined by performing the TEM observation of the sintered body or the SEM observation of a sample obtained by polishing and heat-treating the sintered body, counting the number (S1) of entire grains of the second phase within a view field, the number (S2) of entire grains of the first phase within the same view field, the number (n1) of fine grains of the second phase dispersed in the grains of the first phase within the same view field, and the number (n2) of fine grains of the first phase dispersed in the grains of the second phase within the same view field, and substituting these values to the following equations:

$$W1[\%]=(n1/S1)\times100,$$

$$W2[\%]=(n2/S2)\times100.$$

In addition, with respect to each of Examples 1 to 5 and Comparative Examples 1 to 3, average grain sizes of the first and second phases of the sintered body were measured. Moreover, to evaluate mechanical properties of the sintered body, test specimens having the dimensions of 4 mm×3 mm×40 mm were prepared from the sintered body, and 3-point bending strength and fracture toughness were measured. The fracture toughness was determined by the IF method. Results are listed in Tables 1 and 2.

Moreover, to evaluate the wear resistance of the composite ceramic material, a pin-on-disc wear test was carried out in the presence of distilled water as a lubricant. The pin and the disc are made from the composite ceramic material. The pin is a cylinder solid having a diameter of 5 mm and a length of 15 mm, and a circular cone having an apical angle of 30° is provided on a top of the cylinder solid. The top end of the circular cone is formed with a flat mirror portion having a diameter of 1.5 mm, which is used as a sliding surface. A surface roughness of this sliding surface is 0.005 µm Ra or less.

On the other hand, the disc has a diameter of 50 mm and a thickness of 8 mm. A sliding surface of the disc to be made contact with the pin is a mirror polished surface having a surface roughness of 0.005 µm Ra or less. After the pin was placed on a circumference having a radius of 22 mm from the disc center on the disc, the pin-on-disc test was performed at a disc rotational speed of 60 mm/sec. A sliding distance is constant (25 km), and a load applied to the pin is 60N. Since the diameter of the top end of the pin is 1.5 mm, an initial friction pressure on the top end of the pin corresponds to 33 MPa. Under the above test conditions, the test was repeated three times. Therefore, an average value of those tests was adopted as data. After measuring a reduction in weight of the pin, a wear factor (Wf) was calculated by the following equation.

$$Wf=(W1-W2)/P\cdot L\cdot\rho$$

Where,
Wf: Wear factor ($mm^3$/Nm)
W1: Dry weight (g) of pin before test
W2: Dry weight (g) of pin after test
P: Load (N)
L: Sliding distance (m)
ρ: Density (g/$mm^3$) of test specimen In addition, the Vickers hardness of the composite ceramic material was measured. Measurement results of the wear resistance and the hardness are listed in Table 2.

As understood from the results of Tables 1 and 2, the sintered bodies of Examples 1 to 5 containing 20 to 60 vol % of the $Al_2O_3$ grains of the second phase have the nano-composite structure satisfying both of more than 4% of the first dispersion ratio and more than 1% of the second dispersion ratio. In addition, those sintered bodies provide a high bending strength of more than 1200 MPa as well as excellent fracture toughness of 10.0 MPa·$m^{1/2}$ or more.

On the other hand, since the sintered body of Comparative Example 1 is a $ZrO_2$ sintered body not containing the second phase, the fracture toughness is high, but the bending strength is considerably low. In addition, the sintered body of Comparative Example 2 has the nano-composite structure with high first and second dispersion ratios, and shows excellent fracture toughness. However, since the grain growth of the first phase is not sufficiently inhibited by the second phase, the average grain size (1.8 µm) of the first phase is much larger than that (0.50 µm) of Example 1. As a result, the bending strength of the sintering body of Comparative Example 2 is low, and therefore a preferable balance between the bending strength and the fracture toughness was not obtained. With respect to Comparative Example 3, since the sintered body contains a larger amount of $Al_2O_3$ than Example 5, both the bending strength and the fracture toughness are considerably low. In addition, although the average grain sizes of the first and second phases are small, the second dispersion ratio does not meet the claimed range of the present invention, i.e., 1% or more.

As described above, the purpose of the present invention is to provide a ceramic material having excellent wear resistance and hardness, while maintaining the mechanical strength and toughness under a larger $Al_2O_3$ content than before. The results shown in Table 2 indicate that both of excellent wear resistance and high hardness can be achieved within the range of 20 to 60 vol % of $Al_2O_3$ content. On the contrary, in the Comparative Example 2, the mechanical strength and toughness of the composite ceramic material are relatively high. However, since the $Al_2O_3$ content is small, the wear resistance is considerably poor. On the other hand, in Comparative Example 3 the hardness of the composite ceramic material is remarkably high. However, there is a tendency that the wear resistance deteriorates as well as reductions in mechanical strength and toughness because the $Al_2O_3$ content is too large.

TABLE 1

| | Starting material | | | Composite Ceramic Material Average Grain Size ($\mu$m) | |
|---|---|---|---|---|---|
| | First Phase (mol %) | | Second Phase (vol %) | | |
| | $CeO_2$ | $TiO_2$ | $Al_2O_3$ ($\gamma$-$Al_2O_3$:$\alpha$-$Al_2O_3$) | $ZrO_2$ | $Al_2O_3$ |
| Comparative Example 1 | 11 | 0.04 | 0 | 2.50 | — |
| Comparative Example 2 | 11 | 0.04 | 10 (70:30) | 1.80 | 0.10 |
| Example 1 | 11 | 0.04 | 20 (70:30) | 0.50 | 0.15 |
| Example 2 | 11 | 0.04 | 30 (70:30) | 0.27 | 0.17 |
| Example 3 | 11 | 0.04 | 40 (70:30) | 0.24 | 0.18 |
| Example 4 | 11 | 0.04 | 50 (70:30) | 0.22 | 0.19 |
| Example 5 | 11 | 0.04 | 60 (70:30) | 0.21 | 0.19 |
| Comparative Example 3 | 11 | 0.04 | 70 (70:30) | 0.20 | 0.20 |

TABLE 2

| | Bending Strength (MPa) | Fracture Toughness (MPa·m$^{1/2}$) | Vickers Hardness (GPa) | Wear factor (mm$^3$/Nm × 10$^{-7}$) | First Dispersion Ratio (%) | Second Dispersion Ratio (%) |
|---|---|---|---|---|---|---|
| Comparative Example 1 | 750 | 18.0 | 8.5 | 230 | — | — |
| Comparative Example 2 | 1110 | 17.0 | 9.6 | 53.5 | 6.2 | 4.2 |
| Example 1 | 1300 | 16.5 | 10.7 | 0.150 | 5.9 | 3.5 |
| Example 2 | 1450 | 15.1 | 11.8 | 0.056 | 5.8 | 2.1 |
| Example 3 | 1460 | 13.4 | 12.9 | 0.042 | 5.4 | 1.6 |
| Example 4 | 1390 | 11.4 | 14.0 | 0.035 | 4.8 | 1.6 |
| Example 5 | 1260 | 10.0 | 15.1 | 0.092 | 4.3 | 1.4 |
| Comparative Example 3 | 850 | 7.5 | 16.2 | 3.53 | 2.0 | 0.5 |

Examples 6 to 20

A $ZrO_2$—$Al_2O_3$ composite ceramic material of each of Examples 6 to 20 was produced by the following method. That is, as a first ingredient for providing $ZrO_2$ grains corresponding to a first phase of the composite ceramic material, a tetragonal $ZrO_2$ powder having a specific surface of 15 m$^2$/g and containing 10 to 12 mol % of $CeO_2$ as a stabilizer, or a tetragonal $ZrO_2$ powder containing 10 to 12 mol % of $CeO_2$ as a stabilizer and 0.02 to 1 mol % of $TiO_2$ was used, as shown in Table 3. On the other hand, as a second ingredient for providing $Al_2O_3$ grains corresponding to a second phase of the composite ceramic material, a $\gamma$-$Al_2O_3$ powder prepared by a dry process of the laser abrasion method to have a specific surface of 50 m$^2$/g and a substantially spherical shape of an average diameter of 33 nm was used.

The first and second ingredients were mixed such that an additive amount of the second ingredient is 30% with respect to a total volume of a resultant mixture. The resultant mixture was pulverized in ethanol for 24 hours by means of wet ball milling, and then dried to obtain a first mixed powder. After the first mixed powder was calcined at 1000° C. for 3 hours in the air, a resultant calcined powder was pulverized in ethanol for 24 hours by means of wet ball milling, and then dried to obtain a second mixed powder.

The second mixed powder was molded at the pressure of 10 MPa by uniaxial pressing to obtain a disk-shaped green compact having a diameter of 68 mm. In addition, a CIP (cold isostatic pressing) treatment was performed to the green compact at the pressure of 147 MPa. Subsequently, the green compact was sintered at the sintering temperature of 1440° C. for 3 hours in the air by pressureless sintering to obtain a sintering body.

With respect to each of Examples 6 to 20, the sintered body has a relative density of more than 99%. From results of X-ray diffraction analysis, it was confirmed that the first phase of the respective sintered body is composed of 90 vol % or more of tetragonal $ZrO_2$ and the balance of monoclinic $ZrO_2$.

TABLE 3

| | Starting material | | | Composite Ceramic Material | |
|---|---|---|---|---|---|
| | First Phase (mol %) | | Second Phase (vol %) | Average Grain Size ($\mu$m) | |
| | $CeO_2$ | $TiO_2$ | $Al_2O_3$ | $ZrO_2$ | $Al_2O_3$ |
| Example 6 | 10 | 0.00 | 30 | 0.21 | 0.13 |
| Example 7 | 10 | 0.05 | 30 | 0.25 | 0.15 |
| Example 8 | 10 | 0.30 | 30 | 0.41 | 0.23 |
| Example 9 | 10 | 0.70 | 30 | 0.53 | 0.25 |
| Example 10 | 10 | 1.00 | 30 | 0.59 | 0.28 |
| Example 11 | 11 | 0 | 30 | 0.21 | 0.13 |
| Example 12 | 11 | 0.03 | 30 | 0.24 | 0.14 |
| Example 13 | 11 | 0.20 | 30 | 0.35 | 0.19 |
| Example 14 | 11 | 0.60 | 30 | 0.51 | 0.26 |
| Example 15 | 11 | 0.90 | 30 | 0.57 | 0.27 |
| Example 16 | 12 | 0 | 30 | 0.21 | 0.13 |
| Example 17 | 12 | 0.02 | 30 | 0.23 | 0.14 |

TABLE 3-continued

| | Starting material | | Composite Ceramic Material | |
|---|---|---|---|---|
| | First Phase (mol %) | | Second Phase (vol %) | Average Grain Size (μm) |
| | $CeO_2$ | $TiO_2$ | $Al_2O_3$ | $ZrO_2$ | $Al_2O_3$ |
| Example 18 | 12 | 0.10 | 30 | 0.3 | 0.17 |
| Example 19 | 12 | 0.50 | 30 | 0.49 | 0.25 |
| Example 20 | 12 | 0.80 | 30 | 0.55 | 0.26 |

TABLE 4

| | Bending Strength (MPa) | Fracture Toughness (MPa · m^{1/2}) | First Dispersion Ratio (%) | Second Dispersion Ratio |
|---|---|---|---|---|
| Example 6 | 1000 | 18.8 | 4.2 | 2.1 |
| Example 7 | 1280 | 18.4 | 5.2 | 2.6 |
| Example 8 | 1200 | 18.2 | 5.5 | 2.8 |
| Example 9 | 1180 | 18.0 | 5.7 | 2.9 |
| Example 10 | 1150 | 17.9 | 6.1 | 3.1 |
| Example 11 | 1110 | 15.5 | 4.3 | 2.2 |
| Example 12 | 1380 | 15.2 | 5.2 | 2.6 |
| Example 13 | 1350 | 15.0 | 5.3 | 2.7 |
| Example 14 | 1250 | 14.8 | 5.5 | 2.8 |
| Example 15 | 1230 | 14.7 | 6.0 | 3.0 |
| Example 16 | 1280 | 11.5 | 4.2 | 2.1 |
| Example 17 | 1520 | 11.2 | 5.1 | 2.6 |
| Example 18 | 1490 | 11.1 | 5.4 | 2.7 |
| Example 19 | 1310 | 11.0 | 5.6 | 2.8 |
| Example 20 | 1290 | 10.9 | 5.9 | 3.0 |

From SEM (scanning electron microscope) and TEM (transmission electron microscope) observations of the sintered body, it was confirmed that the sintered body of each of Examples 6 to 20 has a mutual nano-composite structure formed such that fine $Al_2O_3$ grains of the second phase are dispersed within $ZrO_2$ grains of the first phase at a first dispersion ratio listed in Table 4 and fine $ZrO_2$ grains of the first phase are dispersed within $Al_2O_3$ grains of the second phase at a second dispersion ratio listed in Table 4.

In addition, with respect to each of Examples 6 to 20, average grain sizes of the first and second phases of the sintered body were measured. The average grain size of the first phase is in a range of 0.2 to 0.6 μm, and the average grain size of the second phase is less than 0.3 μm. To evaluate mechanical properties of the sintered body, test specimens having the dimensions of 4 mm×3 mm×40 mm were prepared from the sintered body, and 3-point bending strength and fracture toughness were measured. The fracture toughness was determined by the IF method. Results are listed in Tables 3 and 4.

The results listed in Tables 3 and 4 show that the bending strength can be further improved without reduction in the fracture toughness by using a small amount of $TiO_2$ in addition to the stabilizer of $CeO_2$.

Examples 21 to 26

A $ZrO_2$—$Al_2O_3$ composite ceramic material of each of Examples 21 to 26 was produced by the following method. That is, as a first ingredient for providing $ZrO_2$ grains corresponding to a first phase of the composite ceramic material, a tetragonal $ZrO_2$ powder having a specific surface of 15 m²/g and containing 11 mol % of $CeO_2$ as a stabilizer and 0.05 mol % of $TiO_2$ was used. On the other hand, as a second ingredient for providing $Al_2O_3$ grains corresponding to a second phase of the composite ceramic material, a mixture of an α-$Al_2O_3$ powder having an average particle size of 0.2 μm and a γ-$Al_2O_3$ powder prepared by a dry process of the laser abrasion method to have a specific surface of 50 m²/g and a substantially spherical shape of an average diameter of 33 nm was used. In these examples, as shown in Table 5, various mixture ratios by volume of the γ-$Al_2O_3$ powder to the α-$Al_2O_3$ powder were adopted.

The first and second ingredients were mixed such that an additive amount of the second ingredient is 30% with respect to a total volume of a resultant mixture. The resultant mixture was pulverized in ethanol for 24 hours by means of wet ball milling, and then dried to obtain a first mixed powder. After the first mixed powder was calcined at 1000° C. for 3 hours in the air, a resultant calcined powder was pulverized in ethanol for 24 hours by means of wet ball milling, and then dried to obtain a second mixed powder.

The second mixed powder was molded at the pressure of 10 MPa by uniaxial pressing to obtain a disk-shaped green compact having a diameter of 68 mm. In addition, a CIP (cold isostatic pressing) treatment was performed to the green compact at the pressure of 147 MPa. Subsequently, the green compact was sintered at the sintering temperature of 1440° C. for 3 hours in the air by pressureless sintering to obtain a sintering body.

With respect to each of Examples 21 to 26, the sintered body has a relative density of more than 99%. From results of X-ray diffraction analysis, it was confirmed that the first phase of the respective sintered body is composed of 90 vol % or more of tetragonal $ZrO_2$ and the balance of monoclinic $ZrO_2$. From SEM (scanning electron microscope) and TEM (transmission electron microscope) observations of the sintered body, it was confirmed that the sintered body of each of Examples 21 to 26 has a mutual nano-composite structure formed such that fine $Al_2O_3$ grains of the second phase are dispersed within $ZrO_2$ grains of the first phase at a first dispersion ratio listed in Table 6, and fine $ZrO_2$ grains of the first phase are dispersed within the $Al_2O_3$ grains of the second phase at a second dispersion ratio listed in Table 6.

In addition, with respect to each of Examples 21 to 26, average grain sizes of the first and second phases of the sintered body were measured. The average grain size of the first phase is in a range of 0.2 to 0.3 μm, and the average grain size of the second phase is less than 0.2 μm. To evaluate mechanical properties of the sintered body, test specimens having the dimensions of 4 mm×3 mm×40 mm were prepared from the sintered body, and 3-point bending strength and fracture toughness were measured. The fracture toughness was determined by the IF method. Results are listed in Tables 5 and 6.

Examples 27 to 32

A $ZrO_2$—$Al_2O_3$ composite ceramic material of each of Examples 27 to 32 was produced by the following method. That is, as a first ingredient for providing $ZrO_2$ grains corresponding to a first phase of the composite ceramic material, a tetragonal $ZrO_2$ powder having a specific surface of 15 m²/g and containing 11 mol % of $CeO_2$ as a stabilizer and 0.05 mol % of $TiO_2$ was used. On the other hand, as a second ingredient for providing $Al_2O_3$ grains corresponding to a second phase of the composite ceramic material, a mixture of an α-$Al_2O_3$ powder having an average particle size of 0.2 μm and a γ-$Al_2O_3$ powder prepared by a dry process of the laser abrasion method to have a specific surface of 50 m²/g and a substantially spherical shape of an average diameter of 33 nm was used. In these examples, as shown in Table 7, various mixture ratios by volume of the γ-$Al_2O_3$ powder to the α-$Al_2O_3$ powder were adopted.

The first and second ingredients were mixed such that an additive amount of the second ingredient is 30% with respect to a total volume of a resultant mixture. The resultant mixture was pulverized in ethanol for 24 hours by means of wet ball milling, and then dried to obtain a first mixed powder.

Without performing the calcining step, the first mixed powder was molded at the pressure of 10 MPa by uniaxial pressing to obtain a disk-shaped green compact having a diameter of 68 mm. In addition, a CIP (cold isostatic pressing) treatment was performed to the green compact at the pressure of 147 MPa. Subsequently, the green compact was sintered at the sintering temperature of 1440° C. for 3 hours in the air by pressureless sintering to obtain a sintering body.

With respect to each of Examples 27 to 32, the sintered body has a relative density of more than 99%. From results of X-ray diffraction analysis, it was confirmed that the first phase of the respective sintered body is composed of 90 vol % or more of tetragonal $ZrO_2$ and the balance of monoclinic $ZrO_2$. From SEM (scanning electron microscope) and TEM (transmission electron microscope) observations of the sintered body, it was confirmed that the sintered body of each of Examples 27 to 32 has a mutual nano-composite structure formed such that fine $Al_2O_3$ grains of the second phase are dispersed within $ZrO_2$ grains of the first phase at a first dispersion ratio listed in Table 8, and fine $ZrO_2$ grains of the first phase are dispersed within the $Al_2O_3$ grains of the second phase at a second dispersion ratio listed in Table 8.

In addition, with respect to each of Examples 27 to 32, average grain sizes of the first and second phases of the sintered body were measured. The average grain size of the first phase is in a range of 0.2 to 0.3 μm, and the average grain size of the second phase is less than 0.2 μm. To evaluate mechanical properties of the sintered body, test specimens having the dimensions of 4 mm×3 mm×40 mm were prepared from the sintered body, and 3-point bending strength and fracture toughness were measured. The fracture toughness was determined by the IF method. Results are listed in Tables 7 and 8.

From comparison between the results of Examples 21 to 26 and the results of Examples 27 to 32, the influence of the presence or absence of the calcining step on the mechanical properties of the $ZrO_2$—$Al_2O_3$ composite ceramic material can be reviewed. That is, no considerable difference is regarded in fracture toughness irrespective of the presence or absence of the calcining step. However, the bending strength of the composite ceramic material (Examples 21 to 26) in the case of including the calcining step is definitely higher than the bending strength of the composite ceramic material (Examples 27 to 32) in the case of not including the calcining step. In addition, there is a tendency that the difference in bending strength brought by the presence or absence of the calcining step becomes larger as the γ-$Al_2O_3$ content in the second ingredient is 70 vol % or more, and particularly 90 vol % or more.

As understood from the Examples described above, the $ZrO_2$—$Al_2O_3$ composite ceramic material of the present invention has a mutual nano-composite structure formed under a larger $Al_2O_3$ content than before such that extremely fine $ZrO_2$ grains dispersed in $Al_2O_3$ grains by a first dispersion ratio of 2% or more, and preferably 4% or more, and extremely fine $Al_2O_3$ grains dispersed in $ZrO_2$ grains by a second dispersion ratio of 1% or more. By the formation of this mutual nano-composite structure, the composite ceramic material of the present invention can achieve mechanical strength and toughness as well as wear resistance and hardness in high levels not heretofore attained.

Therefore, commercialization of the composite ceramic material of the present invention is expected in various application fields, for example, parts for industrial machine such as ferrule used for optical fiber connector, bearing and dies, cutting tools such as scissors and saw blades, stationery goods, chemical goods such as mechanical seals and milling media, goods for sport, medical devices such as surgical knives, biomaterial parts such as artificial joint, artificial bone, artificial dental root, abutment and crown.

TABLE 5

| | Starting material | | | Composite Ceramic Material Average Grain Size (μm) | |
|---|---|---|---|---|---|
| | First Phase (mol %) | | Second Phase (vol %) | | |
| | $CeO_2$ | $TiO_2$ | $Al_2O_3$ (γ-$Al_2O_3$:α-$Al_2O_3$) | $ZrO_2$ | $Al_2O_3$ |
| Example 21 | 11 | 0.05 | 30 (100:0) | 0.25 | 0.15 |
| Example 22 | 11 | 0.05 | 30 (90:10) | 0.25 | 0.16 |
| Example 23 | 11 | 0.05 | 30 (80:20) | 0.26 | 0.16 |
| Example 24 | 11 | 0.05 | 30 (70:30) | 0.27 | 0.17 |
| Example 25 | 11 | 0.05 | 30 (60:40) | 0.27 | 0.17 |
| Example 26 | 11 | 0.05 | 30 (50:50) | 0.28 | 0.18 |

TABLE 6

| | Bending Strength (MPa) | Fracture Toughness (MPa · m$^{1/2}$) | First Dispersion Ratio (%) | Second Dispersion Ratio (%) |
|---|---|---|---|---|
| Example 21 | 1390 | 15.3 | 15.2 | 2.6 |
| Example 22 | 1400 | 15.4 | 5.3 | 2.5 |
| Example 23 | 1420 | 15.3 | 5.5 | 2.3 |
| Example 24 | 1450 | 15.4 | 6.0 | 2.1 |
| Example 25 | 1420 | 15.5 | 5.5 | 1.8 |
| Example 26 | 1400 | 15.5 | 5.2 | 1.5 |

TABLE 7

| | Starting material | | | Composite Ceramic Material Average Grain Size (μm) | |
|---|---|---|---|---|---|
| | First Phase (mol %) | | Second Phase (vol %) | | |
| | $CeO_2$ | $TiO_2$ | $Al_2O_3$ (γ-$Al_2O_3$:α-$Al_2O_3$) | $ZrO_2$ | $Al_2O_3$ |
| Example 27 | 11 | 0.05 | 30 (100:0) | 0.24 | 0.14 |
| Example 28 | 11 | 0.05 | 30 (90:10) | 0.25 | 0.15 |
| Example 29 | 11 | 0.05 | 30 (80:20) | 0.26 | 0.16 |
| Example 30 | 11 | 0.05 | 30 (70:30) | 0.27 | 0.16 |
| Example 31 | 11 | 0.05 | 30 (60:40) | 0.27 | 0.17 |
| Example 32 | 11 | 0.05 | 30 (50:50) | 0.28 | 0.17 |

TABLE 8

| | Bending Strength (MPa) | Fracture Toughness (MPa · m$^{1/2}$) | First Dispersion Ratio (%) | Second Dispersion Ratio (%) |
|---|---|---|---|---|
| Example 27 | 1180 | 15.0 | 5.0 | 2.4 |
| Example 28 | 1220 | 15.2 | 5.1 | 2.3 |

TABLE 8-continued

|  | Bending Strength (MPa) | Fracture Toughness (MPa · m$^{1/2}$) | First Dispersion Ratio (%) | Second Dispersion Ratio (%) |
|---|---|---|---|---|
| Example 29 | 1280 | 15.1 | 5.4 | 2.2 |
| Example 30 | 1380 | 15.2 | 5.9 | 2.0 |
| Example 31 | 1390 | 15.3 | 5.5 | 1.8 |
| Example 32 | 1390 | 15.3 | 5.2 | 1.5 |

What is claimed is:

1. A method of producing a $ZrO_2$—$Al_2O_3$ composite ceramic material, said composite ceramic material comprising:

a first phase of $ZrO_2$ grains containing 10 to 12 mol % of $CeO_2$ as a stabilizer and having an average grain size of 0.1 μm to 1 μm, said $ZrO_2$ grains composed of 90 vol % or more of tetragonal $ZrO_2$;

a second phase of $Al_2O_3$ grains having an average grain size of 0.1 to 0.5 μm;

wherein said $Al_2O_3$ grains are dispersed within said $ZrO_2$ grains at a first dispersion ratio of 4% or more, which is defined as a ratio of the number of said $Al_2O_3$ grains dispersed within said $ZrO_2$ grains relative to the number of the entire $Al_2O_3$ grains dispersed in the composite ceramic material, and said $ZrO_2$ grains are dispersed within said $Al_2O_3$ grains at a second dispersion ratio of 1% or more, which is defined as a ratio of the number of said $ZrO_2$ grains dispersed within said $Al_2O_3$ grains relative to the number of the entire $ZrO_2$ grains dispersed in the composite ceramic material, wherein the method comprises:

mixing an α-$Al_2O_3$ powder having an average particle size of 0.3 μm or less with a γ-$Al_2O_3$ powder having a specific surface within a range of 10 to 100 m$^2$/g and a substantially spherical shape prepared such that a mixture ratio by volume of the γ-$Al_2O_3$ powder to the α-$Al_2O_3$ powder is in a range of 50:50 to 90:10, thereby obtaining a second powder for providing said $Al_2O_3$ grains;

mixing a first powder for providing said $ZrO_2$ grains with the second powder;

molding a resultant mixture in a desired shape to obtain a green compact, and sintering said green compact at a sintering temperature in an oxygen-containing atmosphere.

2. The method as set forth in claim 1, wherein said resultant mixture is calcined at a temperature of 800° C. or more and less than said sintering temperature, and then pulverized to obtain a calcined powder, and wherein said green compact of the calcined powder is sintered in the oxygen-containing atmosphere.

* * * * *